United States Patent
Yang

(10) Patent No.: US 8,288,984 B2
(45) Date of Patent: Oct. 16, 2012

(54) DC BRUSHLESS MOTOR DRIVE CIRCUIT WITH SPEED VARIABLE-VOLTAGE

(76) Inventor: Tai-Her Yang, Dzan-Hwa (TW)

( * ) Notice: Subject to any disclaimer, the term of this patent is extended or adjusted under 35 U.S.C. 154(b) by 378 days.

(21) Appl. No.: 12/659,679

(22) Filed: Mar. 17, 2010

(65) Prior Publication Data

US 2011/0227516 A1    Sep. 22, 2011

(51) Int. Cl.
*H02P 23/00* (2006.01)
(52) U.S. Cl. .................. 318/811; 318/815; 318/806
(58) Field of Classification Search .......... 388/811, 388/815, 806, 822, 851; 318/758, 759, 762, 318/803, 802
See application file for complete search history.

(56) References Cited

U.S. PATENT DOCUMENTS

2008/0246430 A1* 10/2008 Yanagihara .................. 318/799
* cited by examiner

*Primary Examiner* — Karen Masih
(74) *Attorney, Agent, or Firm* — Bacon & Thomas, PLLC

(57) ABSTRACT

For the present invention, under various running speeds statuses, the voltage supplied to the DC brushless motor is relatively increased or decreased on the basis of the internal setting of the motor drive control device according to the increased or decreased rotational output speed, so as to prevent the shortcoming of too much variation of the input impedance caused by the inductive reactance of the winding accordingly changed when the speed of the DC brushless motor is changed, specifically, to prevent the shortcoming of unable producing required torque resulting from the increased inductive reactance caused by increasing the rotational speed which makes the current value become too low when input by the original working voltage.

4 Claims, 1 Drawing Sheet

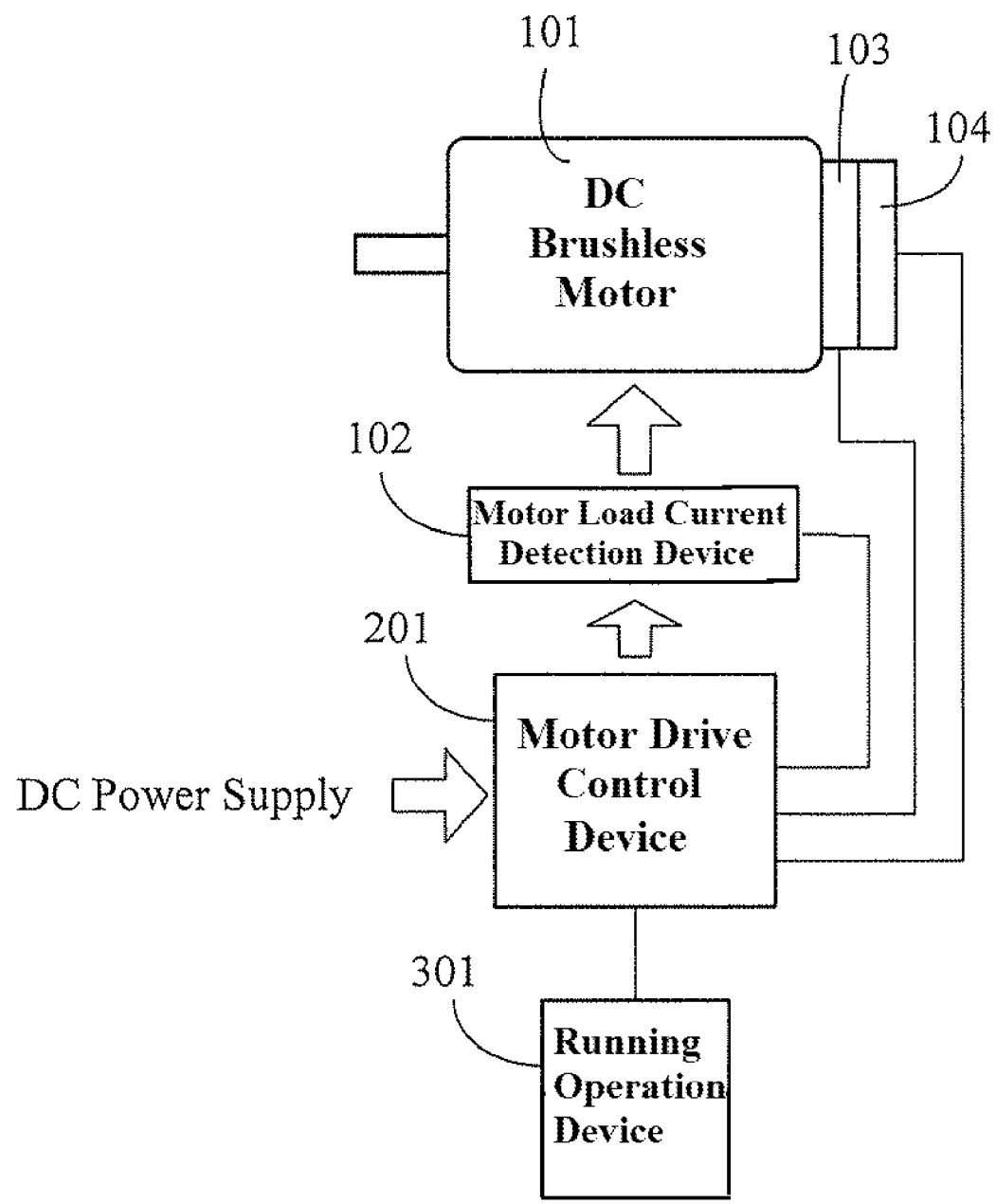

DC BRUSHLESS MOTOR DRIVE CIRCUIT WITH SPEED VARIABLE-VOLTAGE

BACKGROUND OF THE INVENTION (a) Field of the Invention

For the DC brushless motor drive circuit with speed variable-voltage of the present invention, a closed loop drive circuit is formed, in which, under various running speeds statuses, the voltage supplied to the DC brushless motor is relatively increased or decreased on the basis of the internal setting of the motor drive control device according to the increased or decreased output rotational speed, so as to prevent the shortcoming of too much variation of the input impedance caused by the inductive reactance of the winding accordingly changed when the speed of the DC brushless motor is changed, specifically, to prevent the shortcoming of unable producing required torque resulting from the increased inductive reactance caused by increasing the rotational speed which makes the current value become too low when input by the original working voltage.

(b) Description of the Prior Art

The DC brushless motor is usually equipped with the electric machinery angle position detection unit, to detect the variation of the relative electric machinery angle position, during revolution, between the first electric machinery structure constituted by the magnetic field winding and the magnetic circuit, and the second electric machinery structure constituted by the permanent magnetic pole or the winding excitation type magnetic pole, in which the excitation sequence of the magnetic field winding or the excitation polarity of the magnetic field winding is switched by the motor drive control device, and the inductive reactance of the winding is accordingly increased or decreased with the fast or slow speed when the excitation sequence or the excitation polarity of the magnetic field winding is changed.

Therefore, the following shortcoming exists, when the DC voltage input to the DC brushless motor is higher, and the speed of the electric machinery is accordingly faster, if the driven load is increased, because the inductive reactance of the electric machinery is too high, the original input voltage is not enough to increase the input excitation current with the increased load, thus the drive torque is not enough.

SUMMARY OF THE INVENTION

The DC brushless motor drive circuit with speed variable-voltage of the present invention relates to a drive circuit of the DC brushless motor driven by DC power supply and equipped with the electric machinery angle position detection device, in which the DC brushless motor is under various rotational speeds statuses produced on the basis of the magnitude of the input voltage and the load, through the output speed detection device detecting the variation of the rotational speed, and the voltage input into the DC brushless motor is relatively increased or decreased according to the internal setting of the motor drive control device, to form a closed loop drive circuit; especially, during the operation at the range of high rotational speed, through the detected increased rotational speed detected by the output speed detection device to further increase the input voltage of the DC brushless motor according to the setting of the motor drive control device, thereby to overcome the increased inductive impedance of the magnetic field winding resulting from the increased rotational speed of the DC brushless motor by inputting larger current for providing the current of the DC brushless motor to produce required torque.

BRIEF DESCRIPTION OF THE DRAWINGS

FIG. 1 is a schematic view showing the circuit block of the DC brushless motor drive circuit with speed variable-voltage, according to the present invention.

DESCRIPTION OF MAIN COMPONENT SYMBOLS (101): DC brushless motor
(102): Motor load current detection device
(103): Motor electric machinery angle position detection device
(104): Motor speed detection device
(201): Motor drive control device
(301): Running operation device

DETAILED DESCRIPTION OF THE PREFERRED EMBODIMENTS

The DC brushless motor drive circuit with speed variable-voltage of the present invention relates to a drive circuit of the DC brushless motor driven by DC electric power and equipped with the electric machinery angle position detection device, in which the DC brushless motor is under various running speeds statuses produced on the basis of the magnitude of the input voltage and the load, through the output speed detection device detecting the variation of the rotational speed, and the voltage input into the DC brushless motor is relatively increased or decreased according to the internal setting of the motor drive control device, to form a closed loop drive circuit; especially, during the operation at the range of high rotational speed, through the detected increased rotational speed detected by the output speed detection device to further increase the input voltage of the DC brushless motor according to the setting of the motor drive control device, thereby to overcome the increased inductive impedance of the magnetic field winding resulting from the increased rotational speed of the DC brushless motor by inputting larger current for providing the current of the DC brushless motor to produce required torque.

FIG. 1 is a schematic view showing the circuit block of the DC brushless motor drive circuit with speed variable-voltage, according to the present invention, the main components including:

DC brushless motor (101): constituted by the first electric machinery structure composed of the magnetic field winding and the magnetic circuit, and the second electric machinery structure composed of the permanent magnetic pole or the winding excitation type magnetic pole, in which the first electric machinery structure and the second electric machinery structure are driven by the relative revolution through the electric machinery effect between the both, the DC brushless electric machinery is installed with the motor electric machinery angle position detection device (103) for detecting the winding of the first electric machinery structure and the magnetic pole of the second electric machinery structure, and the detected signal is transmitted to the motor drive control device (201) for being the reference of controlling the operation of DC brushless motor (101);

motor load current detection device (102): constituted by the current detection device composed of electromagnetic sensing method or impedance method, for detecting the value of the load current transmitted from the motor drive control device (201) to the DC brushless motor (101);

motor electric machinery angle position detection device (103): constituted by the Hall element with magnet-electric effect, or the electric machinery angle position detection device with photoelectric effect or electromagnetic induction effect, or the electromechanical electric machinery angle position detection device, to be installed at the DC brushless motor (101), for being placed between the first electric machinery structure equipped with magnetic field winding, and the second electric machinery structure equipped with permanent magnetic pole or winding excitation type magnetic pole, to detect the electric machinery angle position between the magnetic field winding and the permanent magnetic pole or the winding excitation type magnetic pole placed at another electric machinery structure with relative coaxial revolution, in which the signal is transmitted to the motor drive control device (201), for being the reference of controlling the operation of DC brushless motor (101); and the detected signal of the pulse density is transformed into the signal of the motor output rotational speed, by way of at least one of the above motor rotational speed detection methods, through the control of the motor drive control device (201);

motor drive control device (201): constituted by the electromechanical circuit device, and/or the solid state electronic device, and/or the microprocessor and related software, which is a circuit device performing linear or chopper type voltage regulation on DC electric energy; in which, the motor drive control device (201) is arranged for inputting DC power, being controlled by running operation device (301), and receiving the signals from the motor electric machinery angle position detection device (103), the motor speed detection device (104), and the motor load current detection device (102), for referring the feedback gain setting of the internal setting of the motor drive control device (201), to implement the control over the excitation phase sequence of magnetic field winding of the DC brushless motor (101), the ON/OFF control, and the control over the excitation voltage, the excitation current, the direction of the excitation current, and the excitation timing through the linear control method or the pulse width modulation method; and running operation device (301): constituted by the manual interface device for controlling the setting of the rotational direction and/or the rotational speed, and/or the voltage, and/or the current of the DC brushless motor (101), and/or used for display device, or constituted by the interface receiving the electric power signal, for controlling the motor drive control device (201), and further controlling the operation of the DC brushless motor (101); in which the main feature is that, through the control of the motor drive control device (201), the input voltage is increased with the increased output rotational speed of the motor; the constitution of the motor speed detection device (104) includes the revolution machine part driven by the motor rotary part or the motor, which is equipped with the angular displacement detector or the linear speed detection generator, through at least one of the above motor speed detection ways, and by way of the process of the motor drive control device (201), to transform into the signal of the output rotational speed of the motor.

For the DC brushless motor drive circuit with speed variable-voltage, the motor speed detection device (104) can optionally not be installed, and instead, through the signal detected by the motor electric machinery angle position detection device (103), the electric machinery angle position and the angular displacement are together provided as the detected signal of the rotational speed, thereby to form the function of the motor speed detection device (104), and by way of the process of the motor drive control device (201), to transform into the signal of the output speed of the motor.

For the DC brushless motor drive circuit with speed variable-voltage, the motor drive control device (201) and the running operation device (301) can be integrated.

For the DC brushless motor drive circuit with speed variable-voltage, the motor drive control device (201) and the running operation device (301) can be individually constituted.

For the DC brushless motor drive circuit with speed variable-voltage of the present invention, under various running speeds statuses, the voltage supplied to the DC brushless motor is relatively increased or decreased on the basis of the internal setting of the motor drive control device according to the increased or decreased output rotational speed, so as to prevent the shortcoming of too much change of the input impedance caused by the inductive reactance of the winding accordingly changed when the speed of the DC brushless motor is changed, specifically, to prevent the shortcoming that the inductive reactance is increased because of the increased speed, thus, if the original running voltage is input, the current value is too low, and the required torque does not be produced.

The invention claimed is:

1. A DC brushless motor drive circuit with speed variable-voltage, which is related to a drive circuit of the DC brushless motor driven by DC electric power and equipped with the electric machinery angle position detection device, in which the DC brushless motor is under various running speeds statuses produced on the basis of the magnitude of the input voltage and the load, through the output speed detection device detecting the variation of the rotational speed, and the voltage input into the DC brushless motor is relatively increased or decreased according to the internal setting of the motor drive control device, to form a closed loop drive circuit, the main components including:

DC brushless motor (101): constituted by the first electric machinery structure composed of the magnetic field winding and the magnetic circuit, and the second electric machinery structure composed of the permanent magnetic pole or the winding excitation type magnetic pole, in which the first electric machinery structure and the second electric machinery structure are driven by the relative revolution through the electric machinery effect between the both, the DC brushless electric machinery is installed with the motor electric machinery angle position detection device (103) for detecting the winding of the first electric machinery structure and the magnetic pole of the second electric machinery structure, and the detected signal is transmitted to the motor drive control device (201) for being the reference of controlling the operation of DC brushless motor (101);

motor load current detection device (102): constituted by the current detection device composed of electromagnetic sensing method or impedance method, for detecting the value of the load current transmitted from the motor drive control device (201) to the DC brushless motor (101);

motor electric machinery angle position detection device (103): constituted by the Hall element with magnet-electric effect, or the electric machinery angle position detection device with photoelectric effect or electromagnetic induction effect, or the electromechanical electric machinery angle position detection device, to be installed at the DC brushless motor (101), for being placed between the first electric machinery structure equipped with magnetic field winding, and the second electric machinery structure equipped with permanent magnetic pole or winding excitation type magnetic pole, to detect the electric machinery angle position between the magnetic field winding and the permanent magnetic pole or the winding excitation type magnetic pole placed at another electric machinery structure with relative coaxial revolution, in which the signal is transmitted to the motor drive control device (201), for being the reference of controlling the operation of DC brushless motor (101); and the detected signal of the pulse density is transformed into the signal of the motor output rotational speed, by way of at least one of the above motor rotational speed detection methods, through the control of the motor drive control device (201);

motor drive control device (201): constituted by the electromechanical circuit device, and/or the solid state electronic device, and/or the microprocessor and related software, which is a circuit device performing linear or chopper type voltage regulation on DC electric energy; in which, the motor drive control device (201) is arranged for inputting DC power, being controlled by running operation device (301), and receiving the signals from the motor electric machinery angle position detection device (103), the motor speed detection device (104), and the motor load current detection device (102), for referring the feedback gain setting of the internal setting of the motor drive control device (201), to implement the control over the excitation phase sequence of magnetic field winding of the DC brushless motor (101), the ON/OFF control, and the control over the excitation voltage, the excitation current, the direction of the excitation current, and the excitation timing through the linear control method or the pulse width modulation method; and running operation device (301): constituted by the manual interface device for controlling the setting of the rotational direction and/or the rotational speed, and/or the voltage, and/or the current of the DC brushless motor (101), and/or used for display device, or constituted by the interface receiving the electric power signal, for controlling the motor drive control device (201), and further controlling the operation of the DC brushless motor (101); in which the main feature is that, through the control of the motor drive control device (201), the input voltage is increased with the increased output rotational speed of the motor; the constitution of the motor speed detection device (104) includes the revolution machine part driven by the motor rotary part or the motor, which is equipped with the angular displacement detector or the linear speed detection generator, through at least one of the above motor speed detection ways, and by way of the process of the motor drive control device (201), to transform into the signal of the output rotational speed of the motor.

2. The DC brushless motor drive circuit with speed variable-voltage as claimed in claim 1, wherein it includes not installed with the motor speed detection device (104), and instead, through the signal detected by the motor electric machinery angle position detection device (103), the electric machinery angle position and the angular displacement are together provided as the detected signal of the rotational speed, thereby to form the function of the motor speed detection device (104), and by way of the process of the motor drive control device (201), to transform into the signal of the output speed of the motor.

3. The DC brushless motor drive circuit with speed variable-voltage as claimed in claim 1 or 2, wherein the motor drive control device (201) and the running operation device (301) are integrated.

4. The DC brushless motor drive circuit with speed variable-voltage as claimed in claim 1 or 2, wherein the motor drive control device (201) and the running operation device (301) are individually constituted.

* * * * *